US011163676B2

(12) United States Patent
Chen et al.

(10) Patent No.: US 11,163,676 B2
(45) Date of Patent: Nov. 2, 2021

(54) ELECTRONIC DEVICE AND METHOD FOR MONITORING SOFTWARE TESTING

(71) Applicant: HON HAI PRECISION INDUSTRY CO., LTD., New Taipei (TW)

(72) Inventors: Pin-Liang Chen, New Taipei (TW); Shu-Jen Tsai, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 50 days.

(21) Appl. No.: 16/681,946

(22) Filed: Nov. 13, 2019

(65) Prior Publication Data

US 2020/0218642 A1 Jul. 9, 2020

(30) Foreign Application Priority Data

Jan. 3, 2019 (CN) .......................... 201910005673.9

(51) Int. Cl.
*G06F 9/44* (2018.01)
*G06F 11/36* (2006.01)
*G06F 11/30* (2006.01)
*G06F 11/32* (2006.01)
*G06F 11/34* (2006.01)

(52) U.S. Cl.
CPC ........ *G06F 11/3692* (2013.01); *G06F 11/302* (2013.01); *G06F 11/321* (2013.01); *G06F 11/323* (2013.01); *G06F 11/3476* (2013.01); *G06F 11/3688* (2013.01)

(58) Field of Classification Search
CPC .... G06F 11/302; G06F 11/321; G06F 11/323; G06F 11/3476; G06F 11/3688; G06F 11/3692

USPC ......................................... 717/110–113, 127
See application file for complete search history.

(56) References Cited

U.S. PATENT DOCUMENTS

| | | | | |
|---|---|---|---|---|
| 9,244,940 | B1 * | 1/2016 | Donsbach | G06F 3/0482 |
| 10,491,314 | B2 * | 11/2019 | Diperna | G06F 3/0346 |
| 10,599,631 | B2 * | 3/2020 | Sterzbach | H04N 17/004 |
| 10,740,845 | B2 * | 8/2020 | Peak | G06Q 20/3278 |
| 2015/0373066 | A1 * | 12/2015 | Miao | G06F 3/1454 |
| | | | | 715/753 |

OTHER PUBLICATIONS

Jon Crabb, "The Ultimate Guide to Recording Mobile Usertests—a UX epic", Aug. 2018, UX Collective, retrieved from https://uxdesign.cc/the-ultimate-guide-to-recording-mobile-user-tests-a-ux-epic-b84dd6d3b16f, 17 pages. (Year: 2018).*

(Continued)

*Primary Examiner* — Ted T. Vo
(74) *Attorney, Agent, or Firm* — ScienBiziP, P.C.

(57) ABSTRACT

A method for monitoring software testing applicable in an electronic device includes controlling a first communication device of the electronic device to communicate with a terminal device when the terminal device running a testing software is placed on the electronic device. A capturing device of the electronic device is controlled to capture a display screen of the terminal device to record a video of what appears on the screen as part of the software testing. The first communication device is controlled to acquire a test log of the terminal device when the test is completed; and the first communication device transmits the recorded video and the test log to a device to analyze the software testing.

13 Claims, 4 Drawing Sheets

(56) References Cited

OTHER PUBLICATIONS

Sturart Murless, "Building a mobile app UX testing setup forunder $50", Jul. 2018, retrieved from https://medium.com/@stu_4636/building-a-mobile-app-ux-testing-setup-for-under-50-ee06ebafdb , 7 pages (Year: 2018).*

* cited by examiner

2
ELECTRONIC DEVICE AND METHOD FOR MONITORING SOFTWARE TESTING

CROSS-REFERENCE TO RELATED APPLICATIONS

This application claims priority to Chinese Patent Application No. 201910005673.9 filed on Jan. 3, 2019, the contents of which are incorporated by reference herein.

FIELD

The subject matter herein generally relates to software testing, and particularly to an electronic device and a method for monitoring software testing.

BACKGROUND

In production, smart electronic devices, such as smart phones, tablet computers etc., software are required to be tested for bugs and generate test logs for engineers to analyze, so as to solve any bugs found. When the electronic devices are tested, testing data is usually transmitted via a USB cable, which may increase human operations.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
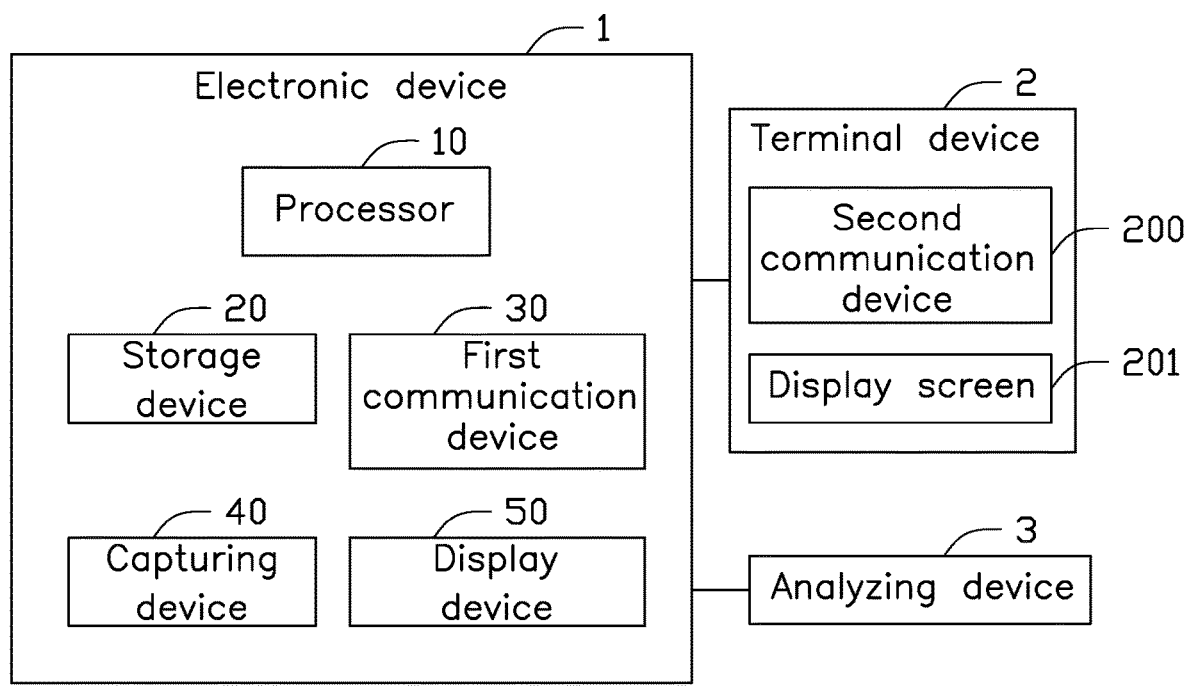
FIG. 1 is a block diagram of an embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

FIG. 1 illustrates an embodiment of an electronic device 1. The electronic device 1 can monitor a software test of a terminal device 2, and transmit information as to the test to an analyzing device 3, thus, engineers can analyze any bugs found during the software test through the analyzing device 3. In at least one embodiment, the terminal device 2 can be a smart phone, a tablet computer, or a PDA (Personal Digital Assistant).

The electronic device 1 includes, but is not limited to, a processor 10, a storage device 20, a first communication device 30, a capturing device 40, and a display device 50. FIG. 1 illustrates only one example of the electronic device 1, other examples can include more or fewer components than illustrated, or have a different configuration of the various components in other embodiments.

The processor 10 can be a central processing unit (CPU), a microprocessor, or other data processor chip that performs functions of the electronic device 1.

In at least one embodiment, the storage device 20 can include various types of non-transitory computer-readable storage mediums. For example, the storage device 20 can be an internal storage system, such as a flash memory, a random access memory (RAM) for temporary storage of information, and/or a read-only memory (ROM) for permanent storage of information. The storage device 20 can also be an external storage system, such as a hard disk, a storage card, or a data storage medium.

In at least one embodiment, the first communication device 30 can be an NFC (Near Field Communication) module. The first communication device 30 can communicate with the terminal device 2 and the analyzing device 3 through NFC.

In at least one embodiment, the capturing device 40 can be a camera. The capturing device 40 can capture images and/or videos.

In at least one embodiment, the display device 50 can be a LCD (Liquid Crystal Display). The display device 50 can display information.

Figure 2:
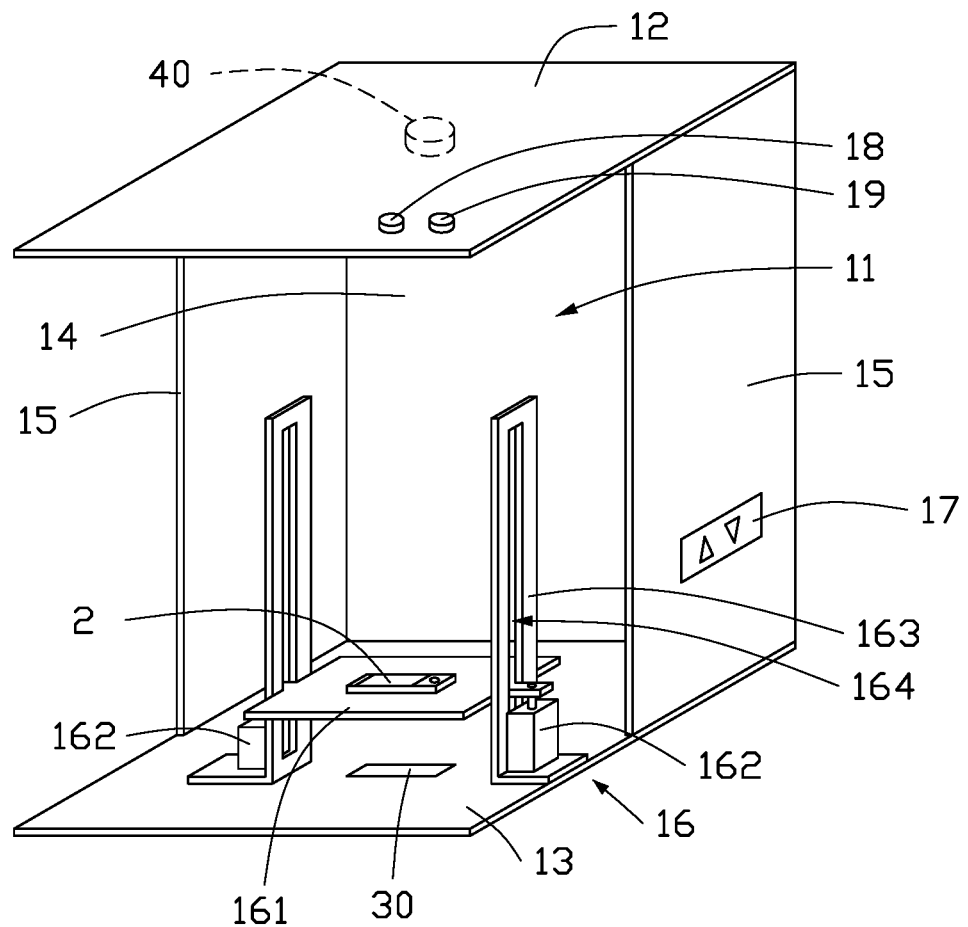
FIG. 2 is a schematic view of an embodiment of the electronic device.

Referring to FIG. 2, in at least one embodiment, the electronic device 1 is box-shaped, and a side of the electronic device 1 defines an opening 11. The electronic device 1 at least includes a top board 12, a base board 13, a back board 14, two side boards 15, an adjusting member 16, an adjusting button 17, a recording button 18, and an uploading button 19. The first communication device 30 and the adjusting member 16 are arranged on the base board 13. The capturing device 40, the recording button 18, and the uploading button 19 are arranged on the top board 12. The adjusting button 17 is arranged on one of the side boards 15.

In at least one embodiment, the adjusting member 16 includes a carrying member 161 and at least one driving member 162. The carrying member 161 carries the terminal device 2. In at least one embodiment, the driving member 162 can be an air cylinder. The driving member 162 is used to support the carrying member 161 and control the carrying member 161 to move up and down. The position of the terminal device 2 carried by the carrying member 161 is thus adjustable.

In at least one embodiment, the adjusting member 16 further includes two fixing members 163, and each fixing member 163 defines a guiding rail 164. The adjusting member 16 includes two driving members 162, each of the two driving members 162 is arranged on the fixing member 163. Each end of the carrying member 161 is connected with the driving member 162 by passing through the guiding rail 164. The two ends of the carrying member 161 can be driven to slide along the guiding rail 164 by the driving member 162, the positions of the terminal device 2 carried by the carrying member 161 can thus be adjusted.

Figure 3:
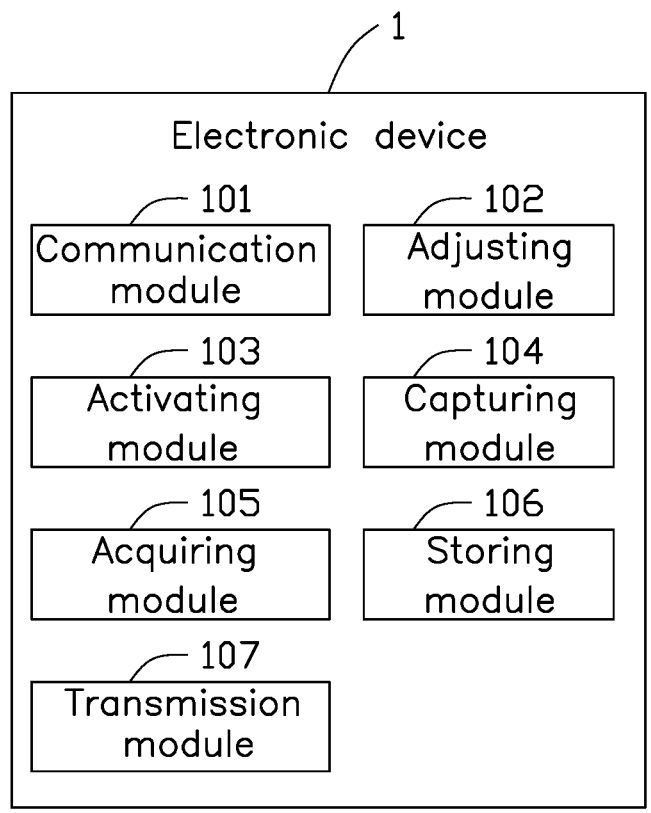
FIG. 3 is a block diagram of an embodiment of modules of the electronic device.

Referring to FIG. 3, the electronic device 1 at least includes a communication module 101, an adjusting module 102, an activating module 103, a capturing module 104, an acquiring module 105, a storing module 106, and a transmission module 107. The modules 101-107 can be collections of software instructions stored in the storage device 20 of the electronic device 1 and executed by the processor 10. The modules 101-107 also can include functionality represented as hardware or integrated circuits, or as software and hardware combinations, such as a special-purpose processor or a general-purpose processor with special-purpose firmware.

The communication module 101 is used to control the first communication device 30 to communicate with the terminal device 2, when the terminal device 2 is placed on the electronic device 1.

In at least one embodiment, the terminal device 2 at least includes a second communication device 200. The second communication device 200 can also be an NFC module. When the terminal device 2 is placed on the carrying member 161 by a user, the second communication device 200 is thus close to the first communication device 30, a distance between the first communication device 30 and the second communication device 200 is within a communication distance range of the near-field communication, then the communication module 101 controls the first communication device 30 to communicate with the terminal device 2.

The adjusting module 102 is used to control the adjusting member 16 to adjust the positions of the terminal device 2 until a display screen 201 of the terminal device 2 is within a capturing range of the capturing device 40.

In at least one embodiment, when the terminal device 2 is placed on the carrying member 161, the capturing device 40 is automatically activated or is manually activated by the user, to capture at least one image of the terminal device 2.

The adjusting module 102 recognizes the at least one image, and determines whether the display screen 201 of the terminal device 2 is in the at least one image. When the display screen 201 of the terminal device 2 is in the at least one image, the adjusting module 102 determines that the display screen 201 is within the capturing range of the capturing device 40. When the display screen 201 of the terminal device 2 is not in the at least one image, the adjusting module 102 determines that the display screen 201 is not within the capturing range of the capturing device 40.

When the display screen 201 is within the capturing range of the capturing device 40, the adjusting module 102 stops adjusting the positions of the terminal device 2. When the display screen 201 is not within the capturing range of the capturing device 40, the adjusting module 102 controls the driving member 162 to drive the carrying member 161 to move up or down, until the display screen 201 is within the capturing range of the capturing device 40.

In other embodiments, the carrying member 161 can carry multiple terminal devices 2. When the multiple terminal devices 2 are placed on the carrying member 161, the capturing device 40 is automatically activated or is manually activated by the user, to capture at least one image of the multiple terminal devices 2.

The adjusting module 102 recognizes the at least one image, and determines whether the display screens 201 of all of the terminal devices 2 are in the at least one image. When the display screens 201 of all of the terminal devices 2 are in the at least one image, the adjusting module 102 determines that the display screens 201 are within the capturing range of the capturing device 40. When at least one of the display screens 201 of all of the terminal device 2 is not in the at least one image, the adjusting module 102 determines that the at least one display screen 201 is not within the capturing range of the capturing device 40.

In detail, when the quantity of display screens 201 which are visible in the images are equal to the quantity of the terminal devices 2 carried on the carrying member 161, the adjusting module 102 determines that the display screens 201 of all of the terminal devices 2 are within the capturing range of the capturing device 40. When the quantity of the display screens 201 in the at least one image is not equal to the quantity of terminal devices 2 carried on the carrying member 161, the adjusting module 102 determines that at least one display screen 201 of the terminal devices 2 is not within the capturing range of the capturing device 40. At this time, the adjusting module 102 controls the driving member 162 to drive the carrying member 161 to move up or down, until the display screens 201 of all of the terminal devices 2 are within the capturing range of the capturing device 40.

In at least one embodiment, the quantity of terminal devices 2 carried on the carrying member 161 can be predetermined by the user, such quantity may be three for example.

In other embodiments, the display device 50 can display the at least one image captured by the capturing device 40. When the capturing device 40 captures the at least one image of the terminal device 2, the user can check the at least one image displayed on the display device 50. When the user determines that the display screen 201 is not in the at least one image, the display screen 201 is not within the capturing range of the capturing device 40. The adjusting button 17 can be pressed by the user, and the adjusting module 102 is activated to control the driving member 162 to drive the carrying member 161 to move up or down, until the display screen 201 of the terminal device 2 is within the capturing range of the capturing device 40.

The activating module 103 is used to activate a testing software to test the terminal device 2, when the display screen 201 of the terminal device 2 is within the capturing range of the capturing device 40.

In at least one embodiment, the testing software can be a system software. In other embodiments, the testing software can be other application.

In at least one embodiment, the activating module 103 can control the first communication device 30 to transmit a control instruction to the terminal device 2. When the terminal device 2 receives the control instruction, the terminal device 2 is controlled to activate the testing software.

In other embodiments, when the display screen 201 of the terminal device 2 is within the capturing range of the capturing device 40, the activating module 103 can output a prompt to the user, and the user can manually activate the testing software. The prompt can be a voice message or a text message displayed on the display device 50.

The capturing module 104 is used to control the capturing device 40 to capture the display screen 201 to record a video of proceedings of the testing software displayed on the display screen 201 in the terminal device 2.

In at least one embodiment, the running of the testing software will be presented on the display screen 201 of the terminal device 2, so that the capturing device 40 can record the display presented on the display screen 201.

In at least one embodiment, when the testing software is activated, the capturing module 104 can automatically record the video. In other embodiments, the recording button 18 can be pressed by the user to activate the capturing module 104 to control the capturing device 40 to record the video.

The acquiring module 105 is used to control the first communication device 30 to acquire a test log of the terminal device 2, when the testing software is completed.

In at least one embodiment, when the software test is completed, the terminal device 2 can generate the test log. The uploading button 19 can be pressed by the user to activate the first communication device 30 to acquire the test log generated by the terminal device 2. The first communication device 30 can transmit a request for acquiring the test log to the terminal device 2 in response to an operation of pressing the uploading button 19, and acquire the test log through the NFC communication.

In other embodiments, when the software test is completed, the terminal device 2 can also automatically upload the test log to the first communication device 30, and the acquiring module 105 can acquire the test log from the first communication device 30.

The storing module 106 is used to store the recorded video of the proceedings of the testing software displayed on the display screen 201 and the test log to the storage device 20.

The transmission module 107 is used to control the first communication device 30 to transmit the recorded video of the proceedings of the testing software displayed on the display screen 201 and the test log to the analyzing device 3.

In at least one embodiment, the transmission module 107 controls the first communication device 30 to acquire the recorded video and the test log from the storage device 20, and transmit the recorded video and the test log to the analyzing device 3 through the NFC communication, thus, the engineers can analyze any bugs found during the software test according to the recorded video and the test log.

Figure 4:
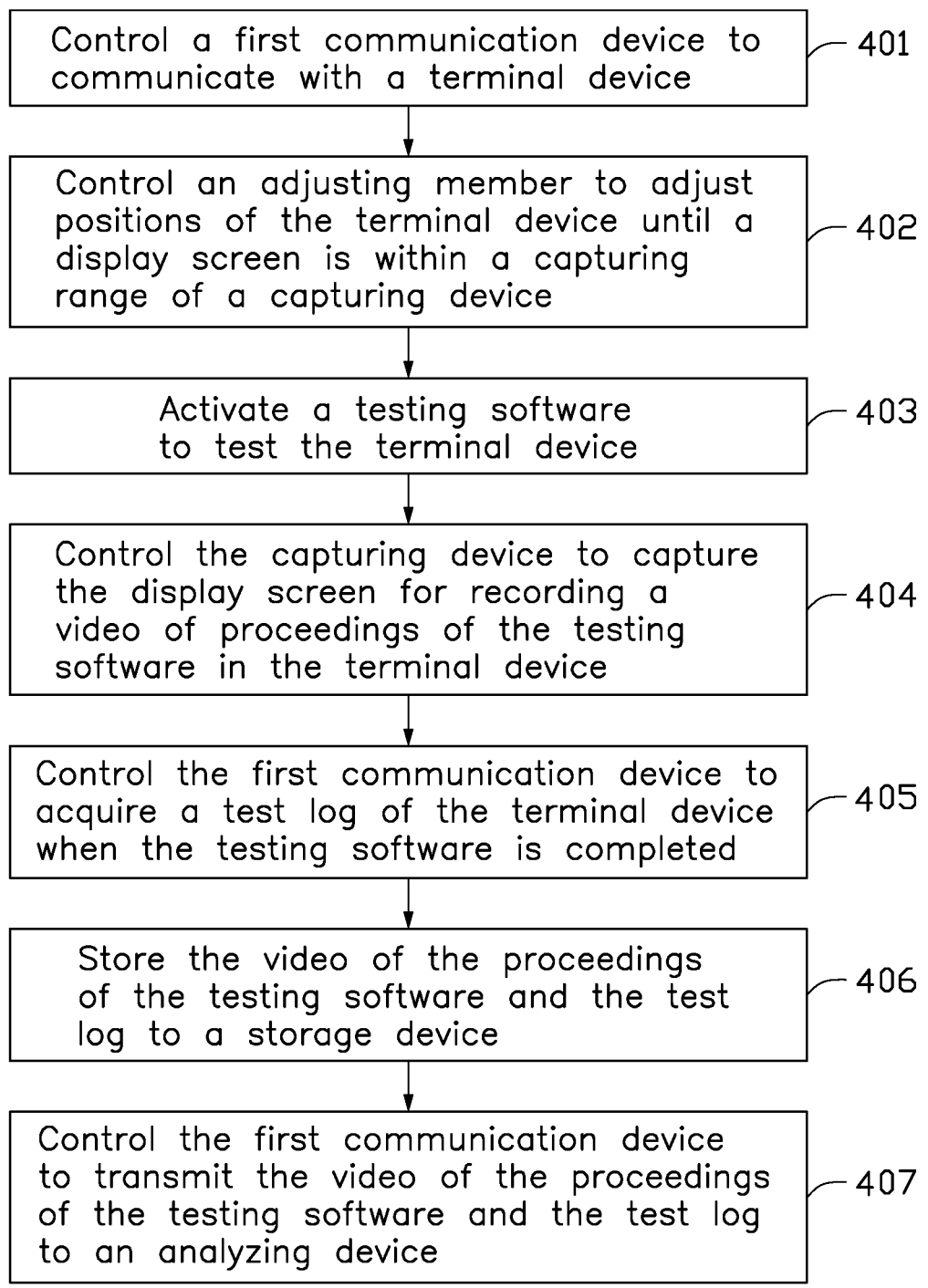
FIG. 4 illustrates a flowchart of an embodiment of a method for monitoring software testing.

FIG. 4 illustrates a flowchart of an embodiment of a method for monitoring software testing. The method is provided by way of example, as there are a variety of ways to carry out the method. The method described below can be carried out using the configurations illustrated in FIG. 1-3, for example, and various elements of these figures are referenced in explaining the example method. Each block shown in FIG. 4 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 401.

At block 401, the communication module 101 controls the first communication device 30 to communicate with the terminal device 2, when the terminal device 2 is placed on the electronic device 1.

At block 402, the adjusting module 102 controls the adjusting member 16 to adjust the positions of the terminal device 2 until the display screen 201 of the terminal device 2 is within the capturing range of the capturing device 40.

At block 303, the activating module 103 activates the testing software to test the terminal device 2, when the display screen 201 of the terminal device 2 is within the capturing range of the capturing device 40.

At block 404, the capturing module 104 controls the capturing device 40 to capture the display screen 201 to record the video of the proceedings of the testing software in the terminal device 2.

At block 405, the acquiring module 105 controls the first communication device 30 to acquire the test log of the terminal device 2, when the testing software is completed.

At block 406, the storing module 106 stores the recorded video of the proceedings of the testing software displayed on the display screen 201 and the test log to the storage device 20.

At block 407, the transmission module 107 controls the first communication device 30 to transmit the recorded video of the proceedings of the testing software displayed on the display screen 201 and the test log to the analyzing device 3.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. An electronic device comprising:
   at least one processor;
   a first communication device coupled to the at least one processor;
   a capturing device coupled to the at least one processor; and
   a storage device coupled to the at least one processor and storing instructions for execution by the at least one processor to cause the at least one processor to:
   control the first communication device to communicate with a terminal device through NFC (Near Field Communication), when the terminal device is placed on the electronic device, wherein the first communication device is an NFC module;
   control the capturing device to capture a display screen of the terminal device to record a video of proceedings of a testing software in the terminal device;
   control the first communication device to acquire a test log of the terminal device through the NFC when the testing software is completed; and
   control the first communication device to transmit the recorded video of the proceedings of the testing software and the test log to an analyzing device.

2. The electronic device according to claim 1, further comprising:
   a top board,
   a base board,
   a back board; and
   two side boards, wherein the electronic device is box-shaped, and a side of the electronic device defines an opening, the first communication device is arranged on the base board, and the capturing device is arranged on the top board.

3. The electronic device according to claim 2, further comprising:
an adjusting member arranged on the base board and configured to carry the terminal device; wherein the least one processor is further caused to:
control the adjusting member to adjust positions of the terminal device until the display screen of the terminal device is within a capturing range of the capturing device.

4. The electronic device according to claim 3, wherein the least one processor is further caused to:
control the capturing device to capture at least one image of the terminal device;
determine whether the display screen of the terminal device is in the at least one image; and
determine that the display screen is within the capturing range of the capturing device when the display screen is in the at least one image.

5. The electronic device according to claim 3, wherein the adjusting member comprises a carrying member and at least one driving member, the carrying member is configured to carry the terminal device, the driving member is configured to support the carrying member, and control the carrying member to move up or down to adjust the positions of the terminal device carried by the carrying member.

6. The electronic device according to claim 2, further comprising:
a recording button arranged on the top board and wherein the capturing device is activated by pressing the recording button to record the video of the proceedings of the testing software on the display screen of the terminal device; and
an uploading button arranged on the top board and wherein the first communication device is activated by pressing the uploading button to acquire the test log of the terminal device.

7. The electronic device according to claim 1, wherein the least one processor is further caused to:
activate the testing software to test the terminal device when the display screen is within a capturing range of the capturing device.

8. The electronic device according to claim 1, wherein the least one processor is further caused to:
store the recorded video of the proceedings of the testing software displayed on the display screen and the test log to the storage device.

9. A method for monitoring software testing applicable in an electronic device comprising:
controlling, when a terminal device is placed on the electronic device, a first communication device of the electronic device to communicate with the terminal device through NFC, wherein the first communication device is an NFC module;
controlling a capturing device of the electronic device to capture a display screen of the terminal device to record a video of proceedings of a testing software in the terminal device;
controlling, when the testing software is completed, the first communication device to acquire a test log of the terminal device through the NFC; and
controlling the first communication device to transmit the recorded video of the proceedings of the testing software and the test log to an analyzing device.

10. The method according to claim 9, further comprising:
controlling an adjusting member of the electronic device to adjust positions of the terminal device until the display screen of the terminal device is within a capturing range of the capturing device.

11. The method according to claim 10, wherein the method of controlling an adjusting member of the electronic device to adjust positions of the terminal device comprises:
controlling the capturing device to capture at least one image of the terminal device;
determining whether the display screen of the terminal device is in the at least one image; and
determining that the display screen is within the capturing range of the capturing device when the display screen is in the at least one image.

12. The method according to claim 9, further comprising:
activating the testing software to test the terminal device when the display screen is within a capturing range of the capturing device.

13. The method according to claim 9, further comprising:
storing the recorded video of the proceedings of the testing software displayed on the display screen and the test log to a storage device of the electronic device.

* * * * *